July 16, 1940.  H. WOCHNER  2,208,063
RADIUS GAUGE FOR AUTOMOBILES
Filed July 9, 1934  2 Sheets-Sheet 1
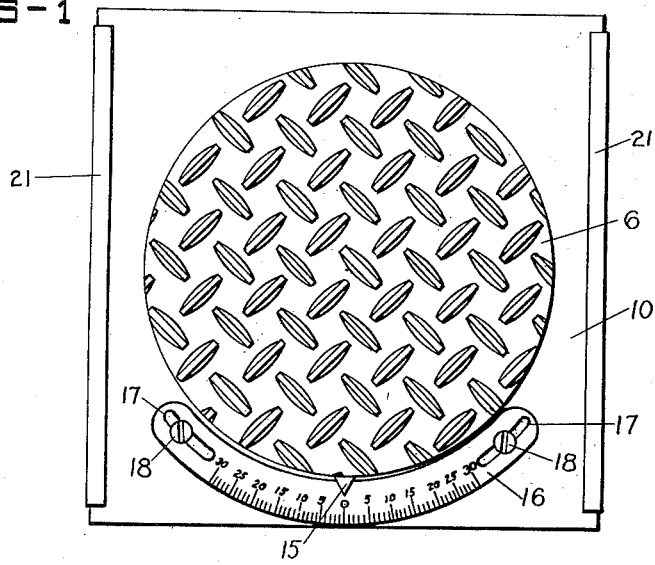
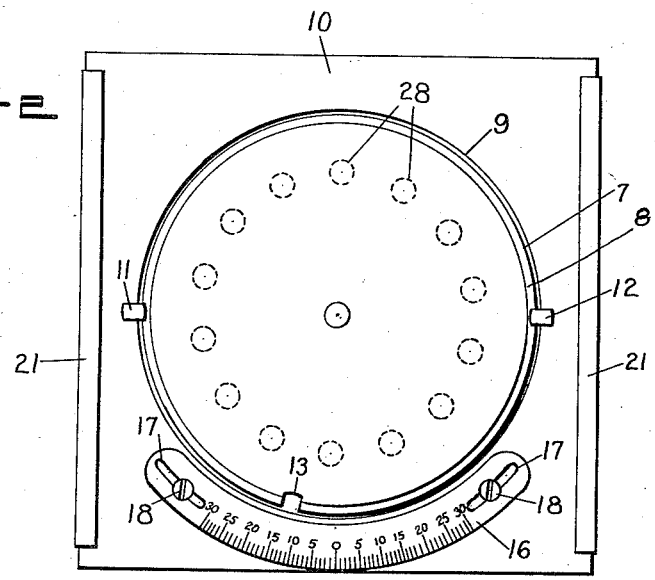
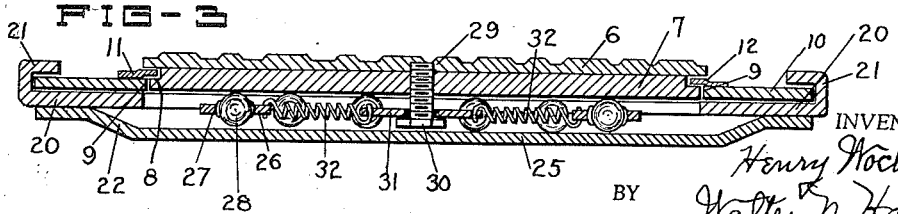
INVENTOR.
Henry Wochner.
BY Walter N. Haskell.
his ATTORNEY.

July 16, 1940.  H. WOCHNER  2,208,063
RADIUS GAUGE FOR AUTOMOBILES
Filed July 9, 1934  2 Sheets-Sheet 2
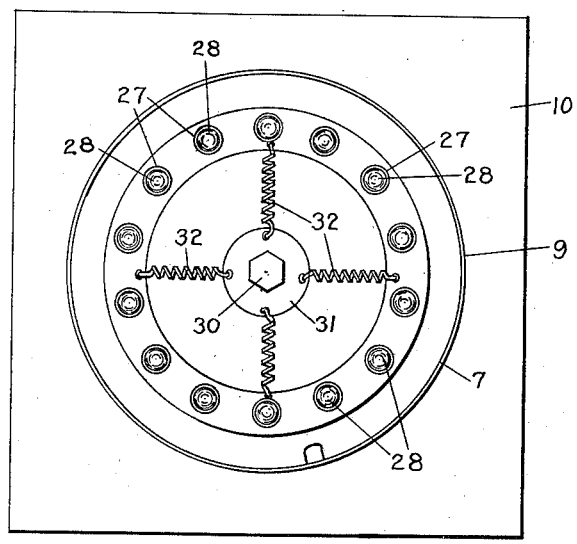
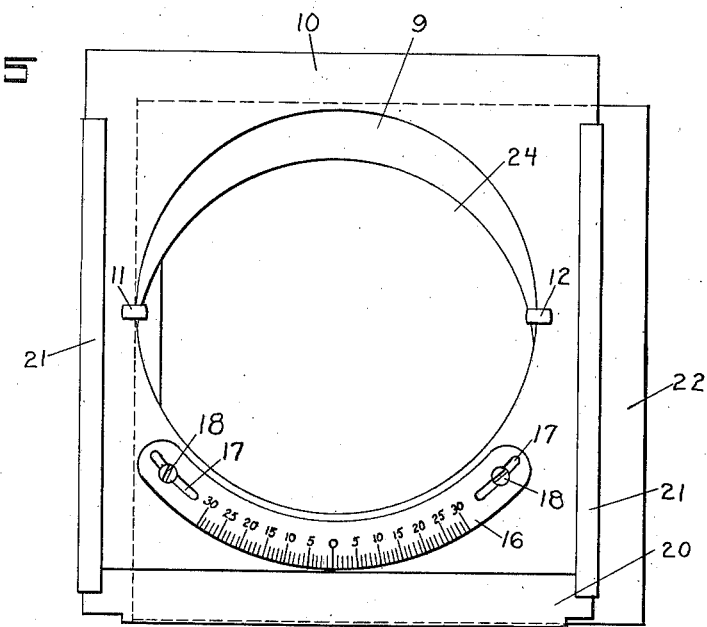
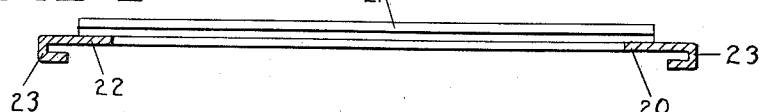
INVENTOR.
Henry Wochner,
BY Walter N. Haskell.
his ATTORNEY.

Patented July 16, 1940

2,208,063

UNITED STATES PATENT OFFICE 2,208,063

RADIUS GAUGE FOR AUTOMOBILES

Henry Wochner, Rock Island, Ill., assignor to Bear Manufacturing Co., a corporation Application July 9, 1934, Serial No. 734,357

2 Claims. (Cl. 33—203)

My invention has reference to a radius gauge for automobiles, and has for its purpose to provide a means for determining the degree of turn of the front wheels of a vehicle when describing a curve. By the use of such means it is possible to make corrections in the mountings of the wheels and control devices thereof, so that they can be made to conform to the specifications of the manufacturers of the vehicles, not only for the single operations of the wheels, but for a pair of steering wheels of a vehicle, so that they will have the proportionate degree of toe-out radius when moving on the inside of a turn or on the outside thereof. The proportion varies with different makes of cars, but assuming twenty degrees to be the toe-out curve for the outside wheel, that of the inside wheel should be approximately twenty-three degrees, and vice versa.

Instruments of the kind mentioned have been provided wherein the wheels have been supported upon a rotatable member in a straight ahead position, and then given a turning movement, with indicating elements on the instrument whereby the degree of turn or toe-out can be read. In moving the wheels on these devices toward one side or the other there is a tendency of the wheel to exert a frictional force on the supporting member other than that of the simple turning movement, tending to influence the action of the gauge so as to cause an improper and false reading thereof. One of the purposes of the present invention is to support the gauge in such a manner that it will accommodate itself readily to any eccentric movement of the wheel, and off-set any undue stress placed on the gauge, leaving it free at all times to give a true reading of the toe-out radius. This is accomplished by having the tread unit mounted on a mechanical floating assemblage or platform, so that the same will yield instantly to any eccentric action of the wheel while it is being turned, regardless of the direction of such movement. This leaves the gauge unit, with which the indicating devices are connected, free to respond to the turning action of the wheel, and give a true record of the toe-out radius under all conditions.

Another feature of the invention consists of a novel arrangement of one of the indicating devices, whereby an adjustment thereof can be made in case the same is not set at the zero point when a wheel is first positioned thereon.

The above-named, and other features and advantages of the invention will more fully appear from the following specification, taken in connection with the acompanying drawings, showing the invention in its preferred embodiment. In said drawings—

Fig. 1 is a plan view of the invention in a normally set position.

Fig. 2 is a similar view with the tread plate 6 removed.

Fig. 3 is a vertical medial section of the intion.

Fig. 4 is a lower plan view of the tread unit.

Fig. 5 shows the floating platform in plan view, with the plates 10 and 20 in shifted positions.

Fig. 6 is a section through the plate 20, taken at right angles to that of Fig. 3.

The tread unit, or part by which a wheel is more directly supported, consists of a disk 6, mounted on a plate 7 of corresponding shape, the periphery of said plate being provided with an annular channel 8. These two plates may be integrally formed, and comprise a turntable of limited size, the movement of which is controlled by the plate 7, which is rotatable in an opening 9 in a thin flat plate 10, which latter plate also comprises a part of the floating platform. Fixed to the plate 10 at the sides of said opening are lugs 11 and 12, which enter the space between the disk 6 and plate 7, and prevent accidental release of the tread unit. In the edge of the plate 7 is a recess 13, which can be brought into register with the lug 11, so that the plate can be raised at that edge and then slipped from beneath the lug 12 at the opposite side. It can be returned to position by a reversal of this movement.

Fixed to the edge of the plate 6 is a pointer 15, for use with markings on a gauge-plate 16, attached to the upper face of the plate 10, said markings starting at zero in the center and being graduated away therefrom at each side, the numbers shown thereby being of sufficient value to include the usual specifications for the radius degrees for the turning wheels. The plate 16 is provided at its ends with slots 17, through which set-screws 18 pass into the plate 10, permitting a longitudinal movement of said plate for the length of the slots. In case a wheel is positioned on the gauge in a normal or straight ahead position and the pointer 15 does not register with the zero mark, the position of the plate 16 can be adjusted until the pointer and zero mark coincide.

The plate 10 is slidably mounted on a similar plate 20, but is limited to a movement thereon in one back and forth direction by means of guides 21 on the side edges of said plate 20, formed by bending projecting portions of said plate upwardly and inwardly. The plate 20 is in turn held slidably on a base-plate 22, by means of guide channels 23 on the edges of the plate 20 alternating with those on which the guides 21 are fixed, and formed from projecting portions of the plate 20 which are bent downwardly and inwardly. The movement of the plate 20 is in a direction at right angles to that of the plate 10, as will appear from Fig. 5, wherein the plate 20 is shown moved to one side, and the plate 10 upwardly. The plate 20 is provided with a central opening 24 corresponding in size and shape with that of the opening 9, and the plate 22 is dished to provide a depressed floor section 25.

The tread unit is also provided with a yieldable anti-friction apparatus, consisting of a ring 26, containing a series of ball pockets 27, in which are mounted balls 28, so as to be capable of rolling on the floor 25. Fixed centrally of the tread plates is a bolt 29, provided at its lower end with a head 30, above which is a small ring 31, turning freely on said bolt, and connected with the ring 26 by a set of balance springs 32. The plate 7 rests upon the balls 28, and can move freely thereon in any direction, carrying with it the plate 10.

In the operation of the device, an automobile wheel is positioned on the plate 6 on a line parallel with the top and bottom edges of the plate, with the gauge 16 in a readable position below the same. The plate 6 is preferably corrugated or roughened in some manner to prevent any slipping action of the wheel thereon. After being properly positioned with the wheel in a straight-ahead position, the steering wheel is operated to give the desired turning movement to the wheel, such movement carrying with it the disk 6 and moving the pointer 15 along the scale on the plate 16, from which readings can be taken. Assuming the wheel to be positioned on the disk 6 with a vertical line through the center of the king-pin in line with the axial line of said disk, and the turning of the wheel to be accomplished without disturbing such alignment, there would be a simple rotary movement of the disk, but it has been found in practice that there is usually a tendency to an eccentric movement of the wheel, tending to urge the disk in one direction or the other, and to compensate for this said disk is permitted to move freely in any such direction by the action of the slide-plates or floating plates 10 and 20, assisted by the action of the anti-friction apparatus beneath the tread unit. Various combinations of the movements shown in Fig. 5 may be had, so that the vertical axis of the disk 6 can have a universal movement, in addition to the rotary movement, and can follow any angle or arc, or can be made to describe a circle.

The springs 32 permit the ball ring 26 to move freely in any direction, in response to the movement of the tread plates, space for the operation of said ring being accorded by the opening 24 in the plate 20 the movement of said ring being limited in all directions by the edge of said opening. As the springs at one side of the mechanism expand those at the other side contract, with a tendency to increase tension and store power at both sides, so that all of said springs assist in restoring the ring mechanism and slide-plates to a normal position after the same have been actuated.

Changes can be made in the form and arrangement of various parts of the invention, within the scope of the invention, as set forth and claimed herein.

What I claim and desire to secure is:

1. In a device of the class described, a platform consisting of a fixed plate and pair of slidable plates, one of said plates having guides on two of its edges formed by bending a portion of such plate upwardly and inwardly, and guides on the other two edges formed by bending a portion of the plate downwardly and inwardly, the other of said slidable plates having a central opening for the rotative action of a tread plate.

2. A radius turning gauge for vehicle wheels comprising, in combination, a base plate having a dished central portion, a pair of members supported on said base plate and slidably mounted for movements in directions angular to one another, a wheel supporting element rotatably mounted in the upper of said pair of members, means for measuring the angle through which said element rotates with respect to said upper member, and bearings carried within said dished portion of said base plate freely supporting said element for slidable and rotatable movement with respect to the base plate.

HENRY WOCHNER.